May 29, 1928.
C. D. COLE
1,671,702
TRACTOR HITCH
Filed Feb. 12, 1927
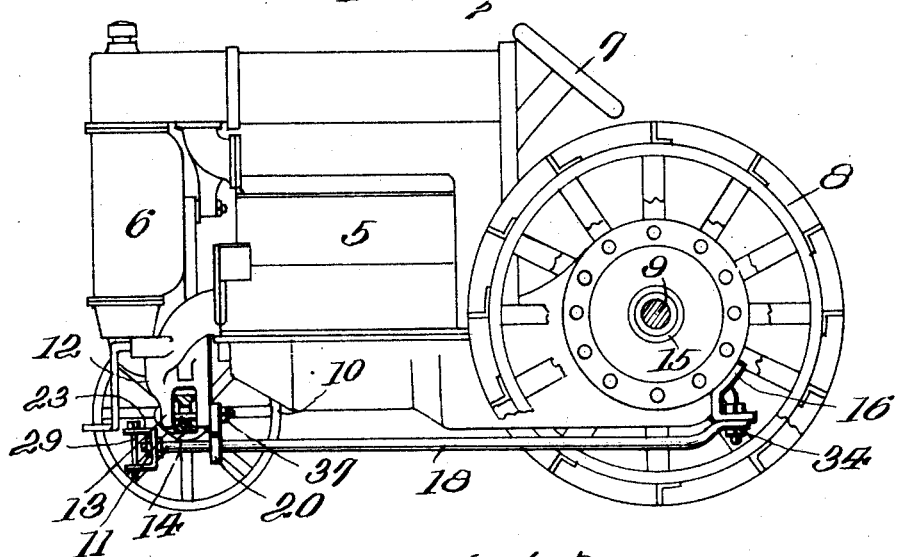
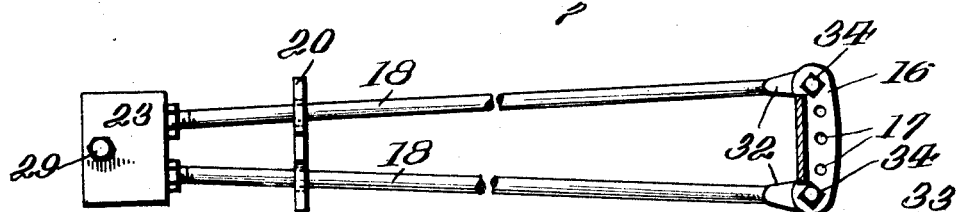
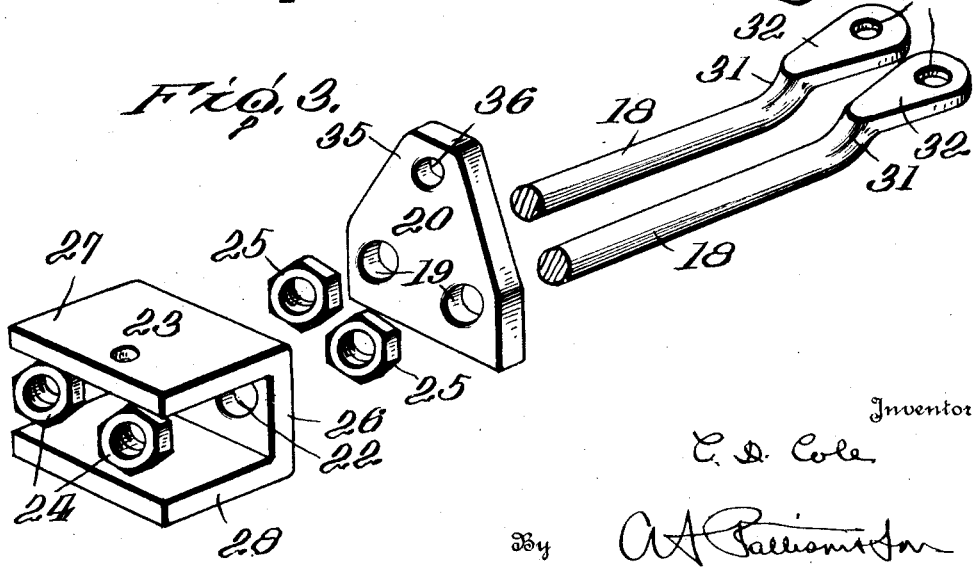
Inventor
C. D. Cole Patented May 29, 1928.

1,671,702

UNITED STATES PATENT OFFICE.

CHARLES D. COLE, OF SABINSVILLE, PENNSYLVANIA.

TRACTOR HITCH.

Application filed February 12, 1927. Serial No. 167,699.

This invention relates to improvements in a tractor hitch, the hitch being of a push type, whereby the tractor may be readily utilized to push machinery or vehicles as desired.

The primary object of this invention is the provision of a hitch which is of simple and cheap construction, but at the same time sufficiently strong to withstand the use to which it will be put.

A further object of the invention is the provision of a hitch of the character described, which is of a construction whereby it can be readily and easily attached to tractors now on the market without the necessity of alteration of the tractor in any manner.

A still further object of the invention is the provision of the pusher type of hitch for tractors which is so constructed and attached to the tractor that the major portion of the strain or stress is placed upon the rear axle or end of the tractor.

Another and further object of the invention is the provision of a pusher type of a hitch which is so constructed and attached to the tractor that the pushing stress or force upon the tractor is such as to prevent the front end of the tractor from lifting, and to materially aid in the holding down of the front end of the tractor.

Other novel features of the construction and improved results will appear from the following description and the accompanying drawings.

In the accompanying drawings:

Figure 1 is a view in side elevation of a tractor having the improved hitch applied thereto.

Figure 2 is a top plan view of the hitch, a portion of the tractor rear axle housing being in transverse section.

Figure 3 is a perspective view of the hitch, the parts being shown in unassembled and strung out relation.

The embodiment of the hitch, as shown in the drawings, is primarily designed for attachment to the well-known Fordson tractor now on the market, but it will be readily realized that those minor changes necessary to adapt the hitch to various tractors are such as to be within the skill of any mechanic.

In attaching the hitch to the tractor, the draw-bar cap carried on the rear axle housing is utilized. Certain early models of the Fordson tractor are not provided with this draw-bar cap, but the caps can be readily obtained and applied to the tractor when it is desired to attach my improved hitch.

In moving separators, headers, and other heavy farm implements for any distance, the common practice is to pull them. It has been found, however, that it is very difficult and at times practically impossible to pull the implements to the exact spot desired. This can be readily understood when it is remembered that many of the implements are placed in barns where the space is not sufficient to permit of the tractor pulling the implement into the barn. Many other occasions arise where the implement cannot be properly placed by pulling.

At such a time it is not only desirable but necessary to push the implement in front of the tractor. The broad idea of pushing an implement or vehicle before the tractor is not new. It has been found, however, that with those tractor hitches now known for pushing, the construction is such that the front wheels of the tractor are lifted from the ground. Immediately this takes place it will be readily seen that all control for the steering of the tractor and of the vehicle being pushed is lost.

It has also been found that those pusher hitches attached to the front of the tractor do not in any manner aid the traction of the rear or power wheels of the tractor.

In the past it has been the practice when it is impossible to pull the implement to the desired position to push the implements to the spot desired by backing the tractor. This manner of operation has the primary disadvantage that the reverse gear of the tractor is nowhere near as low as the first forward speed and, consequently, in many instances heavy implements cannot be moved by the tractor when it is in reverse gear. The above manner of operation has the additional disadvantage that the operator of the tractor must look backward to steer both the tractor and the implement being pushed. It will be obvious that it is more difficult to manipulate and handle the tractor to properly place the implement when the tractor is being operated backwardly, or in a reverse direction.

Having the above in mind, the present invention has been made to overcome these objections and, in addition, to provide an improved tractor hitch over those now known or in use.

The tractor illustrated in the drawings includes an engine 5, radiator 6, and a steering wheel 7, together with such other usual parts as are usually found in the make up of a tractor. The rear tractor driving wheels are illustrated at 8, being supported upon the rear axle 9. The front wheels are illustrated at 10, being supported or carried by the front axle 11. The front end of the tractor is provided with a transverse member 12 having a downwardly extending forked portion 13. This forked portion is of a size to receive the axle 11 and is so positioned as to receive the axle at a point centrally of its length.

A suitable bolt or trunnion 14 passes through the fork and the axle and constitutes the trunnion for the front axle of the tractor. The rear axle housing is designated at 15 and the tractor draw-bar cap 16 is suitably bolted to this housing. The draw-bar cap is provided with a plurality of holes 17 to provide means for connection therewith.

The tractor structure herein described is in every manner the well-known Fordson tractor now in wide use and well-known to the public. The tractor is described in broad terms only for the reason that the manner of attachment of the hitch upon the tractor may be more readily understood.

The hitch comprises a pair of bars or rods 18, which adjacent their front end pass through suitable openings 19 in a guide and supporting plate 20. These rods beyond the plate terminate in threaded ends 21, which pass through the openings 22 in the clevis 23. The threaded ends of the bars receive at their outer ends nuts 24, while nuts 25 are positioned to clamp the rear face of the rear wall 26 of the clevis.

It will be clearly seen that the clevis 23 is of a U-shape in cross-section. The rear vertical wall of the clevis is designated at 26, while the outwardly extending top and bottom of the clevis is designated at 27 and 28. The clevis is provided with a connecting or hitch pin 29, which passes through the clevis top and bottom. The lower end of the pin is provided with an opening 30, adapted to receive a cotter-key or the like for fastening it against removal.

The rear ends of the bars or rods 18 are offset or bent slightly upward as at 31, and terminate in enlarged flattened ends 32, having therein bolt openings 33, whereby these ends of the rods are easily and readily attached to the two end openings 17 of the draw-bar hitch by means of two bolts 34.

The supporting and guide plate 20 has an end 35 extending a considerable distance above the rods 18. This end portion of the plate is provided with a suitable bolt opening 36, adapted to receive the inner end of the front axle trunnion or bolt 14, whereby this member is attached to and supported against the rear wall of the fork 13 of the cross-member 12.

By reference to the drawings, it will be seen that the inner end of the hitch rods are supported in separated relation by the drawbar cap, and that they extend forwardly beneath the rear axle and the engine of the tractor, to pass through the supporting plate 20 and terminate in the clevis 27, at a point beyond the front axle of the tractor. The openings in the plate 20 and the rear wall 26 of the clevis are so positioned that the two rods converge towards one another as they approach the clevis, without, however, meeting at any point.

From the foregoing it will be seen that the hitch can be very quickly and easily attached to the tractor as it means the placing and clamping of only two bolts and three nuts. The bolt attachment is made at the draw bar cap at the rear of the tractor, while the supporting plate is fastened in position by the removable and replacement of the nut 37.

It is pointed out that the disadvantages heretofore mentioned in respect to hitches now known are overcome by this device. The supporting plate 20 receives practically none of the pushing stress or force and consequently the front end of the tractor does not have a tendency to lift when in operation with the hitch. The supporting plate 20 does, however, prevent lateral movement of the hitch and assures that the thrust push upon the draw-cap through the rod 18 is at all times in the same alinement in respect to the tractor.

With the pushing force concentrated on the rear axle of the tractor, it will be seen that there would actually follow a tendency for greater traction, as this force would extend in a downward direction as well as rearwardly. The downward pressure, of course, causes the lugs of the driving wheels to deeply and firmly engage the ground.

The device, of course, has the advantage that the operator of the tractor has a clear vision in front of him of the manipulation which will be necessary to accomplish the positioning of the implement in the desired place. Additionally, the operator has at his disposal a greater amount of power in the first forward speed of the tractor than would be the case were he operating in the reverse gear to push the implement through the reversing or backing of the tractor.

A comparatively few number of parts compose this new tractor hitch and it will, therefore, be seen that the hitch will be cheap and simple of manufacture.

This hitch construction has been found to work very advantageously for coupling two or more tractors in a straight line which is often done when pulling very heavy loads.

Having thus described my invention, what I claim and desire to secure by Letters Patent is:—

1. In combination with a tractor having a front axle trunnion and a rear axle draw-bar cap, a hitch comprising a pair of bars having their rear ends attached to said cap in separated spaced relation, said bars extending forwardly beneath the tractor and converging towards one another at their front end, a supporting plate for the front end of said bars having therein openings in spaced relation for the reception of said bars, said plate supported by said axle trunnion, and means carried by the front end of the bars for connection with an agricultural implement.

2. In combination with a tractor having a front axle trunnion and a rear axle draw-bar cap provided with a plurality of openings, a hitch comprising a pair of bars having openings in their rear ends, means passing through the openings in the cap and the openings of the rear ends of the bars for supporting them in spaced relation upon the cap, said bars extending forwardly beneath the tractor and converging towards one another, a plate having therein spaced openings adapted to receive said bars and support them in spaced relation, said plate provided with means for attachment to said front axle trunnion, and means carried by the front end of the bar for connection to an agricultural implement.

3. In combination with a tractor having as a part of its standard equipment a front axle trunnion and a rear axle draw-bar cap provided with openings, a hitch construction which can be quickly and easily attached to the tractor without change in the tractor equipment, said hitch comprising a pair of bars having means for attachment to said draw-bar cap in spaced relation thereon, said bars extending forwardly beneath the tractor and converging toward one another, a plate having therein openings adapted to receive and support said bars in spaced relation, said plate further provided with an opening adapted to receive said front axle trunnion and be supported thereby, and means carried by the front end of the bars for connection to an agricultural implement.

4. In combination with a tractor having a front axle trunnion and a rear axle draw-bar cap having openings therein, a hitch comprising a pair of bars having means for quick attachment in spaced relation on said cap, said bars extending forwardly beneath the tractor and converging towards one another, a plate having therein three openings, two of which are adapted to receive and support said bars in spaced relation and the third opening being adapted to receive said front axle trunnion and be supported thereby, the front ends of said bars being threaded to extend beyond said plate and through suitable spaced openings in the rear wall of a U-shaped clevis, and said clevis attached to the ends of said bars by nuts carried by said threaded bar ends and positioned at the opposite sides of the rear wall of said clevis.

In testimony whereof I hereunto affix my signature.

CHARLES D. COLE.